F. L. POPE,
Assignor to himself, S. C. HENDRICKSON, J. N. ASHLEY, and J. D. LINCOLN.
Electric Railway-Signal.
No. 8,045. Reissued Jan. 22, 1878.
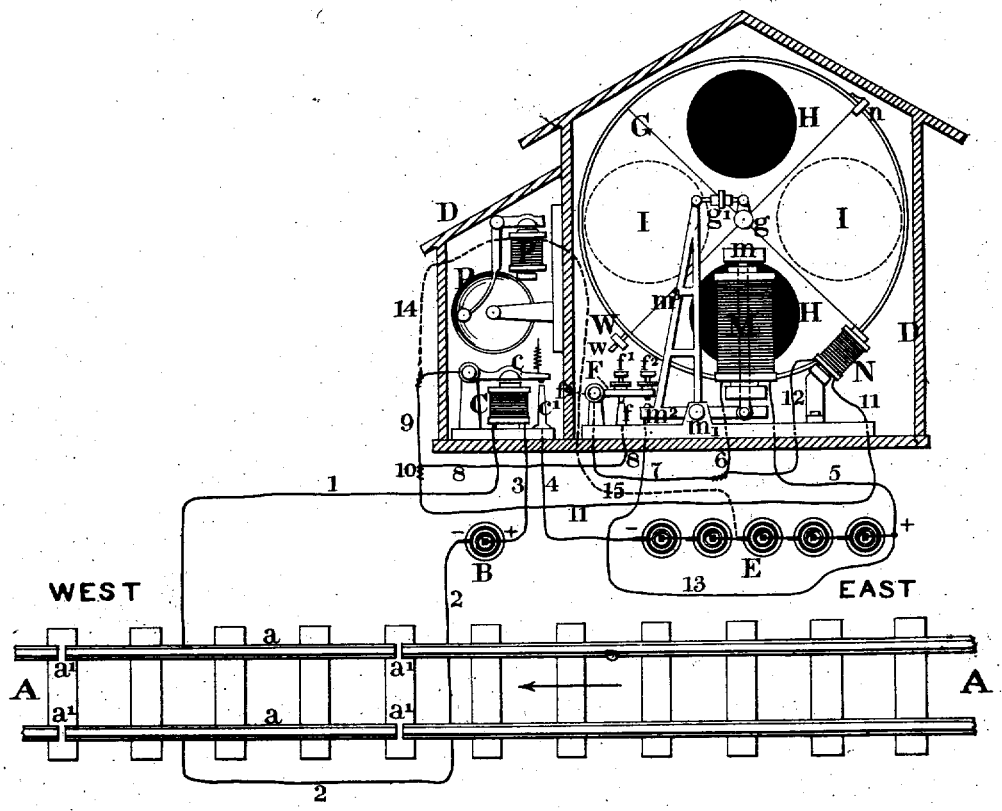
Witnesses: C. Bruce Jeffers, William J. Bok.
Inventor. Frank L. Pope.

UNITED STATES PATENT OFFICE.

FRANK L. POPE, OF ELIZABETH, N. J., ASSIGNOR TO HIMSELF, STEPHEN C. HENDRICKSON, JAMES N. ASHLEY, AND JAMES D. LINCOLN.

IMPROVEMENT IN ELECTRIC RAILWAY-SIGNALS.

Specification forming part of Letters Patent No. 149,152, dated March 31, 1874; Reissue No. 8,045, dated January 22, 1878; application filed August 25, 1877.

DIVISION B.

*To all whom it may concern:*

Be it known that I, FRANK L. POPE, of Elizabeth, in the county of Union and State of New Jersey, have invented certain new and useful Improvements in Electric Signaling Apparatus for Railroads; and I hereby declare that the following is a full, clear, and exact description thereof, reference being had to the accompanying drawing, which forms part of this specification.

My invention relates to certain improvements in electric signaling apparatus for railroads, and means of operating the same, for which United States Letters Patent No. 129,425 were granted to me July 16, 1872.

The object of my present invention is to so arrange a series of semaphoric and audible signals actuated by electro-magnetism at intervals along the line of a railroad that each of the said signals will be automatically exhibited or sounded by the passage of a train, and will remain visible or audible until the train is under the protection of the next succeeding signal, when the first-mentioned signal will be withdrawn or reversed, by which means one train following another upon the same track may be cautioned, and thus prevented from approaching too closely to the preceding train or coming in collision with it.

The invention set forth in this division consists in the combination of an additional or secondary circuit with a primary circuit, composed in part of a rail or rails of a railroad-track; and also in the combination of a visual and an audible signal, either or both, with the said primary and secondary circuits, in such manner that the said signals will be actuated whenever a metallic connection is established between two of the rails of the track, which are insulated from each other.

By the employment of a secondary circuit, I am enabled to overcome in a great measure the difficulties arising from the necessity which has hitherto existed of adjusting the signaling-instruments to the varying strength of the current, caused by the necessarily imperfect insulation during wet weather of that portion of the circuit formed by the rails of the track. The signaling-instruments are included in a secondary circuit not subject to such variations, which circuit is controlled by a relay placed in the primary circuit. The relay is not interrupted in its action by any ordinary variation of the current in the primary circuit, and may be readily and conveniently adjusted whenever necessary.

The accompanying drawing is a general plan of a signaling apparatus embodying my invention.

A A represent a portion of the line of a railroad. A short section, *a a*, of the track is insulated from metallic contact with the remainder by spaces *a' a' a' a'*, or otherwise. The two rails *a a*, when bridged by the wheels and axles of a passing locomotive or car, complete an electric circuit, which includes the wires 1, 2, and 3, the battery B, and the helices of the relay C, so that, during the passage of a locomotive or train over the insulated section of track *a a*, which forms a circuit-closer for the primary circuit, the relay C will continuously close a secondary circuit for a sufficient length of time to allow a signal-disk to be moved into position by its action by bringing the lever *c* into contact with the post *c'*, in a manner well understood. The relay C is placed in a compartment of the box or case D, which also contains the machinery of the primary signal. The box or case D is mounted upon a suitable support above or alongside the track.

When the relay-lever *c* is brought in contact with the post *c'*, a secondary circuit is closed, which includes the wire 4, battery E, wire 5, electro-magnet M, wires 6 and 7, lever F, screw $f^1$, post *f*, and wires 8 and 9.

The course of the primary and secondary circuits is plainly shown by the heavy lines in the figure. When the circuit is closed at *c c'*, the electro-magnet M becomes charged and attracts the armature *m*, which is attached by means of a rod (shown by dotted lines) to the lever $m^2$, having its fulcrum at $m^1$. A rigid arm, $m^3$, fixed to this lever, revolves the signal-disk G by means of the crank *g* and pitman *g'*, as more fully explained in my former patent of August 27, 1872, No. 130,941.

In my present invention, however, I prefer to make use of a single disk, G, having two targets, H H, of some suitable strongly-contrasting color, arranged upon it in such a manner that one-fourth of a complete revolution of the disk G will cause the targets H H to be displayed through circular openings I I in the case D. (Indicated by the dotted lines.)

It will therefore be understood, without further explanation, that when the electro-magnet M is charged the armature *m* will be attracted, and the disk G turned through the distance of one-fourth of a revolution, thereby displaying the targets H H of the signal through the openings I I.

In order to move the signal-disk G in a prompt and effective manner by means of an electro-magnet, it is necessary to construct it of very light and thin material, such as cloth or paper stretched over a hoop. It is also necessary to inclose it on all sides with a case, D D, provided with suitable openings I I, as hereinbefore explained, through which the signals are exhibited. These openings should be covered by glass. The object of this arrangement is to prevent currents of air from interfering with the movement of the signal, so that a much smaller battery-power is required than would be necessary if the signal were exposed to the action of the wind.

The lever or circuit-changer F is pivoted at $f^4$, and in its normal position is supported by the screw $f^1$, which rests upon the post *f*; but when the armature *m* has nearly completed its stroke, as hereinbefore explained, the extremity of the lever $m^2$ comes in contact with the screw $f^2$, forming an electrical connection at that point, and at the same time raising the lever F and breaking contact between *f* and $f^1$. The effect of this is to transfer the current of the battery E from the electro-magnet M to the electro-magnet N. The current will now take the path which may be traced as follows: Commencing at the negative or — pole of battery E, thence through wire 4, post *c'*, lever *c*, wires 9, 10, and 11, electro-magnet N, wires 12 and 7, lever F, screw $f^2$, and wire 13, to the positive or + pole of the battery.

The object of this arrangement of circuits is as follows: First, the cutting off of the current from the signal-magnet M before the completion of the stroke prevents the violent shock to the apparatus which would otherwise result from the greatly-increased attractive power exerted by the magnet at the end of the stroke, when the armature is nearly in contact with the poles, and the full power of the battery immediately becomes available for other purposes; second, the electro-magnet N is thrown into circuit, and the momentum of the disk G, after the circuit through M is broken, is sufficient to bring the lug or armature *n*, attached to its circumference, into contact with the magnet N, and the attractive force of the latter exerted upon the lug or armature *n* serves to firmly lock the signal-disk G in its new position, and at the same time to prevent any recoil or vibration.

An alarm-bell or vibrator, P, operated or controlled by an electro-magnet, *p*, may be employed in connection with the primary signal, and operated by the same relay C and battery B. Upon closing the relay a branch circuit will be formed through the wires 4, 14, and 15, which will include the magnet *p*.

The manner in which the apparatus is operated by the passage of a locomotive or train will now be explained: When the front wheels and axle of the locomotive pass onto the circuit-closer formed by the insulated section of track *a a*, the signal-disk G is turned, as hereinbefore explained, and the targets H H displayed through the openings I I, indicating "danger" or "caution." During the time that the entire train is passing over the track-circuit closer *a a*, the apparatus will remain in the position last described; but when the last car has passed off from the insulated section, the circuit of the relay C, (which I term the "primary circuit,") and also that which acts upon the electro-magnets M and N of the visual signal and upon the electro-magnet *p* of the audible signal, (each of which circuits I term a "secondary circuit,") will be broken. If suitable means are employed for retaining the visual signal in position, the said signal will continue to be displayed after the circuit is broken; otherwise it will return to its normal position by the action of the counterbalance-weight W The weight W is adjustable upon a small spindle, *w*, and is placed upon the periphery of the signal-disk G. It should be sufficient to slightly overbalance the weight of the armature *n*, and to cause the signal to return to its original position when the attraction between N and *n* is destroyed. When placed upon the periphery of the disk in this manner, a very small weight is sufficient to accomplish this result, and much friction is thereby avoided.

In some cases it may be preferable to arrange the signal-disk so that the danger-signal may be concealed by the action of the electro-magnet, and displayed by the action of the counterbalancing-weight W, and this may be done without in any manner changing the general principle upon which the signal is operated.

I do not herein claim, in general, the use of the rails of a railroad-track as a portion of an electrical circuit for operating a signal; neither do I claim the devices shown for transmitting the motion of the armature *m* to the signal-disk G.

I claim as my invention—

1. An additional or secondary circuit, in combination with a primary circuit, composed in part of a rail or rails of a railroad-track, substantially as and for the purpose herein specified.

2. The combination of the following elements: a primary circuit, composed of the conductors 1, 2, and 3 and the rails *a a* of a railroad-track connected thereto, so arranged that said circuit will be completed by establishing a metallic connection between two of the said rails, insulated from each other, a secondary circuit, operated and controlled by a relay, C, placed in said primary circuit, a visual or semaphoric signal, G, and an electro-magnet, M, substantially as and for the purpose herein specified.

3. The combination of the following elements: a primary circuit, composed of the conductors 1, 2, and 3 and the rails *a a* of a railroad-track connected thereto, so arranged that said circuit will be completed by establishing a metallic connection between two of the said rails, insulated from each other, a secondary circuit, operated by a relay, C, placed in said primary circuit, and an audible signal, P, under the control of an electro-magnet, substantially as specified.

FRANK L. POPE.

Witnesses:
CLARENCE CURY,
GEORGE A. HAMILTON.